United States Patent
Schroeder

(10) Patent No.: US 6,622,232 B2
(45) Date of Patent: Sep. 16, 2003

(54) APPARATUS AND METHOD FOR PERFORMING NON-ALIGNED MEMORY ACCESSES

(75) Inventor: Jacob J. Schroeder, Lyngby (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/860,981

(22) Filed: May 18, 2001

(65) Prior Publication Data

US 2002/0174317 A1 Nov. 21, 2002

(51) Int. Cl.⁷ .................................................. G06F 3/00
(52) U.S. Cl. ........................... 711/219; 710/66; 710/65; 711/200; 711/202; 711/219
(58) Field of Search ..................... 710/65, 66; 711/200, 711/202, 219; 712/300

(56) References Cited

U.S. PATENT DOCUMENTS

| | | | |
|---|---|---|---|
| 4,447,878 A | * 5/1984 | Kinnie et al. ................ 370/362 |
| 4,495,598 A | * 1/1985 | Vahlstrom et al. .......... 708/209 |
| 4,602,350 A | * 7/1986 | Gray .......................... 708/405 |
| 4,845,664 A | * 7/1989 | Aichelmann et al. ....... 711/105 |
| 4,992,931 A | * 2/1991 | Hirasawa ..................... 710/66 |
| 5,394,528 A | * 2/1995 | Kobayashi et al. ......... 710/307 |
| 5,517,627 A | 5/1996 | Petersen ...................... 710/131 |
| 5,680,642 A | 10/1997 | Johnson ........................ 710/33 |
| 5,701,517 A | 12/1997 | Carpenter ..................... 710/66 |
| 5,802,064 A | 9/1998 | Lieberman ................... 370/469 |
| 5,822,620 A | 10/1998 | Malik et al. ................. 712/300 |

OTHER PUBLICATIONS

Sikka, S., et al., "Memory–Efficient State Lookups with Fast Updates", *Proceedings of ACM SIGCOMM 2000 Conference*, Computer Communication Review, 335–347, (Aug.–Sep. 2000).

* cited by examiner

*Primary Examiner*—Than V. Nguyen
(74) *Attorney, Agent, or Firm*—Schwegman, Lundberg, Woessner & Kluth, P.A.

(57) ABSTRACT

A memory that supports non-aligned memory accesses includes a field address generator circuit, multiple field memories, and a data rotation circuit. The field address generator circuit generates multiple field addresses in response to an address associated with a memory access. Each field memory receives one of the field addresses from the field address generator circuit. The data rotation circuit rotates data associated with the memory access based upon the memory access address to support a non-aligned access. The memory can support either non-aligned read accesses or non-aligned write accesses. A method for performing non-aligned read or write memory accesses is also described.

32 Claims, 6 Drawing Sheets

APPARATUS AND METHOD FOR PERFORMING NON-ALIGNED MEMORY ACCESSES

FIELD OF THE INVENTION

The present invention relates to the field of memories. More particularly, this invention relates to an apparatus and method that support non-aligned memory accesses.

BACKGROUND OF THE INVENTION

Computer systems include memory which is organized as a number of words. Each word includes a collection of bits which can generally be accessed at the same time. For example, each word may be 16, 32, 64, 128, etc. bits wide. In big endian order, the bits can be numbered with the most significant bit on the left, and the least significant bit on the right. For example, a 32-bit wide word can be numbered from bit 31 (i.e., the most significant bit) on the left, to bit 0 (i.e., the least significant bit on the right). Often, each word is divided into F uniform fields, with each field having B bits. A common width for each field is eight bits (i.e., B=8), which comprises a byte or an "octet". Thus, a 32-bit wide word is often organized as four fields (i.e., F=4) having eight bits (i.e., B=8) each. The fields are stored in memory from lower addresses to higher addresses. In big endian order, addresses of fields in a full-width word can be numbered starting with zero on the left, with increasing addresses to the right. With a word organized into F fields of B bits each, the alignment or offset of an address is defined as the remainder when the address is divided by F. When the alignment of a word is zero, the word is aligned in memory, and any access (e.g., read or write) of that word is aligned. When, however, the alignment of a word is non-zero, the word is non-aligned, and any access of that word is non-aligned.

FIG. 1, for example, provides a graphical representation 100 of three 32-bit words stored in a memory. Each 32-bit word is divided into four fields (i.e., F=4) of eight bits (i.e., B=8) each, with the first, second, third and fourth fields including bits 31–24, 23–16, 15–8 and 7–0, respectively. In this example, the first word stores data ABCD from a starting address "a+0" to an ending address "a+3", the second word stores data EFGH from a starting address "a+4" to an ending address "a+7", and the third word stores data IJKL from a starting address "a+8" to an ending address "a+11". Thus, all three of these 32-bit words are stored with a 0 boundary alignment (i.e., a 0 offset) since 0 is the remainder when the starting addresses "a+0", "a+4" and "a+8" are divided by 4. Thus, these three words are aligned in memory, and any access will be an aligned access.

In contrast, assume that the 32-bit words stored in the memory are non-aligned. For example, assume that the first word stores the data BCDE from a starting address "a+1" to an ending address "a+4", and a second word stores the data FGHI from a starting address "a+5" to an ending address "a+8". In this case, both 32-bit words are stored with a "+1" boundary alignment (i.e., a "+1" offset) since 1 is the remainder when the starting addresses "a+1" and "a+5" are divided by 4. Thus, any access of either word will be a non-aligned access. Similarly, a first 32-bit word storing CDEF and a second 32-bit word storing GHIJ would be stored with a "+2" alignment since 2 is the remainder when starting addresses "a+2" and "a+6" are divided by 4, and a first 32-bit word storing DEFG and a second 32-bit word storing HIJK would be stored with a "+3" alignment since 3 is the remainder when starting addresses "a+3" and "a+7" are divided by 4. In these cases, an access of any of these non-aligned words would require a non-aligned memory access.

Generally, memories support only aligned memory accesses in a single clock cycle, and are not configured to support non-aligned memory accesses. For example, in a memory organized as four fields (i.e., F=4) of eight bits (i.e., B=8) each, only accesses of aligned 32-bit words with starting addresses "a+0", "a+4", "a+8", etc. (i.e., starting addresses where the remainder of the address divided by 4 is 0) can take place in a single clock cycle, while accesses of non-aligned 32-bit words with starting addresses "a+1", "a+2", "a+3", "a+5", etc. (i.e., starting addresses where the remainder of the address divided by 4 is non-0) are not supported. Thus, using the data of FIG. 1, accesses to the aligned 32-bit word storing ABCD can take place in a single clock cycle, while accesses to the non-aligned 32-bit words that store BCDE, CDEF or DEFG are not supported.

One solution to the problem of performing non-aligned memory accesses involves translating a single non-aligned memory access into two aligned accesses, and properly merging the results of the two aligned accesses. For example, a single access of the non-aligned 32-bit word that stores data BCDE starting at address "a+1" could be translated into a first aligned access starting at address "a+0" and a second aligned access starting at address "a+4", followed by a merger of the results of these two aligned accesses. This scheme, unfortunately, requires two aligned memory accesses plus additional processing, and cannot be completed in a single clock cycle. Thus, a non-aligned memory access performed using this scheme will take longer to complete than an aligned memory access.

Therefore, it would be desirable to provide an apparatus and method that support non-aligned memory accesses without needing translation into multiple aligned accesses. Such an apparatus and method may be less complex and may be performed more quickly than the conventional solution described above for performing the non-aligned accesses.

DESCRIPTION OF THE PREFERRED EMBODIMENTS

Figure 1:
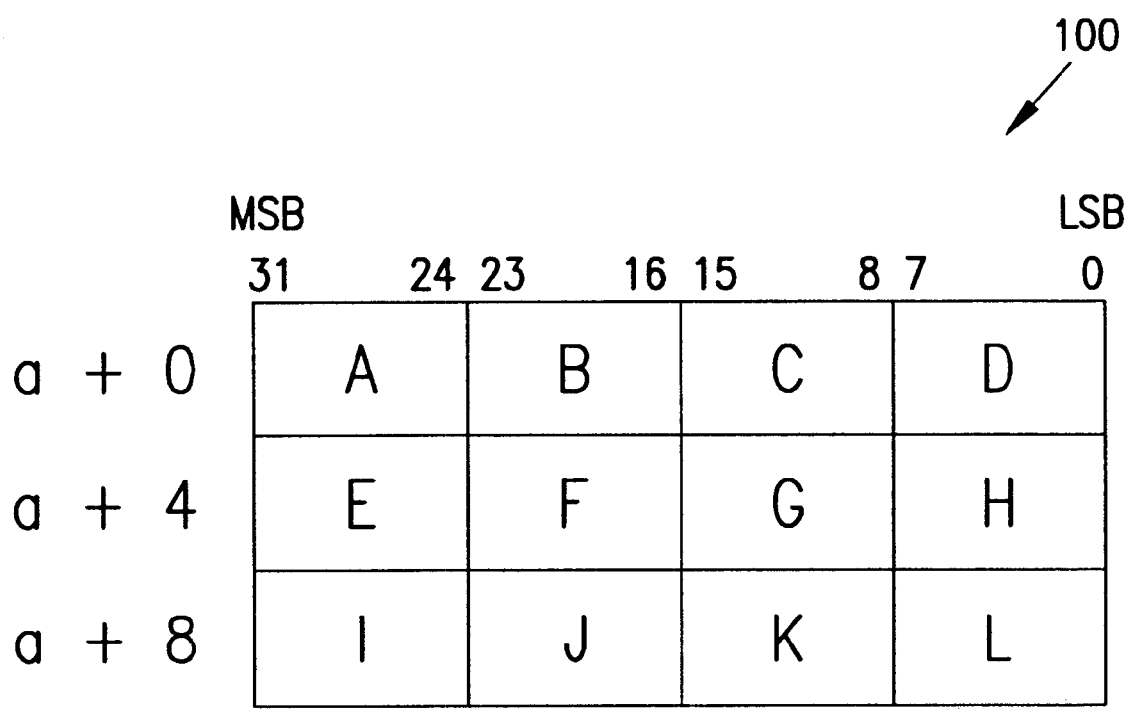
FIG. 1 is a graphical representation of three 32-bit words stored in a memory, wherein each of the words includes four fields, and each of the fields includes eight bits.

In the following detailed description, reference is made to the accompanying drawings, which form a part hereof, and in which is shown, by way of illustration, specific embodiments in which the present invention may be practiced. In the drawings, like numerals refer to like components throughout the views. These embodiments are described in sufficient detail to enable those of ordinary skill in the art to practice the present invention, and it is to be understood that these embodiments may be combined, or that other embodiments may be utilized and that structural, logical and electrical changes may be made without departing from the spirit and the scope of the present invention. The following detailed description is, therefore, not to be taken in a limiting sense, and the scope of the invention is defined by the appended claims and the equivalents thereto.

In accordance with one aspect of the present invention, a memory that supports non-aligned memory accesses includes a field address generator circuit, a plurality of field memories, and a data rotation circuit. The field address generator circuit generates a plurality of field addresses in response to a memory access address that is associated with a memory access. Each field memory receives one of the field addresses from the field address generator circuit. The data rotation circuit rotates data that is associated with the memory access based on at least a portion of the memory access address to support a non-aligned access. In one embodiment of the present invention, the memory access is a read access. In another embodiment of the invention, the memory access is a write access.

In accordance with another aspect of the invention, a method of performing a non-aligned access of a memory includes receiving a memory access address associated with a non-aligned memory access, generating a plurality of field addresses in response to the memory access address, applying each of the field addresses to a corresponding field memory, and rotating data associated with the non-aligned memory access based on at least a portion of the memory access address to support the non-aligned memory access. In various embodiments, the memory access can be either a read access or a write access.

Figure 2:
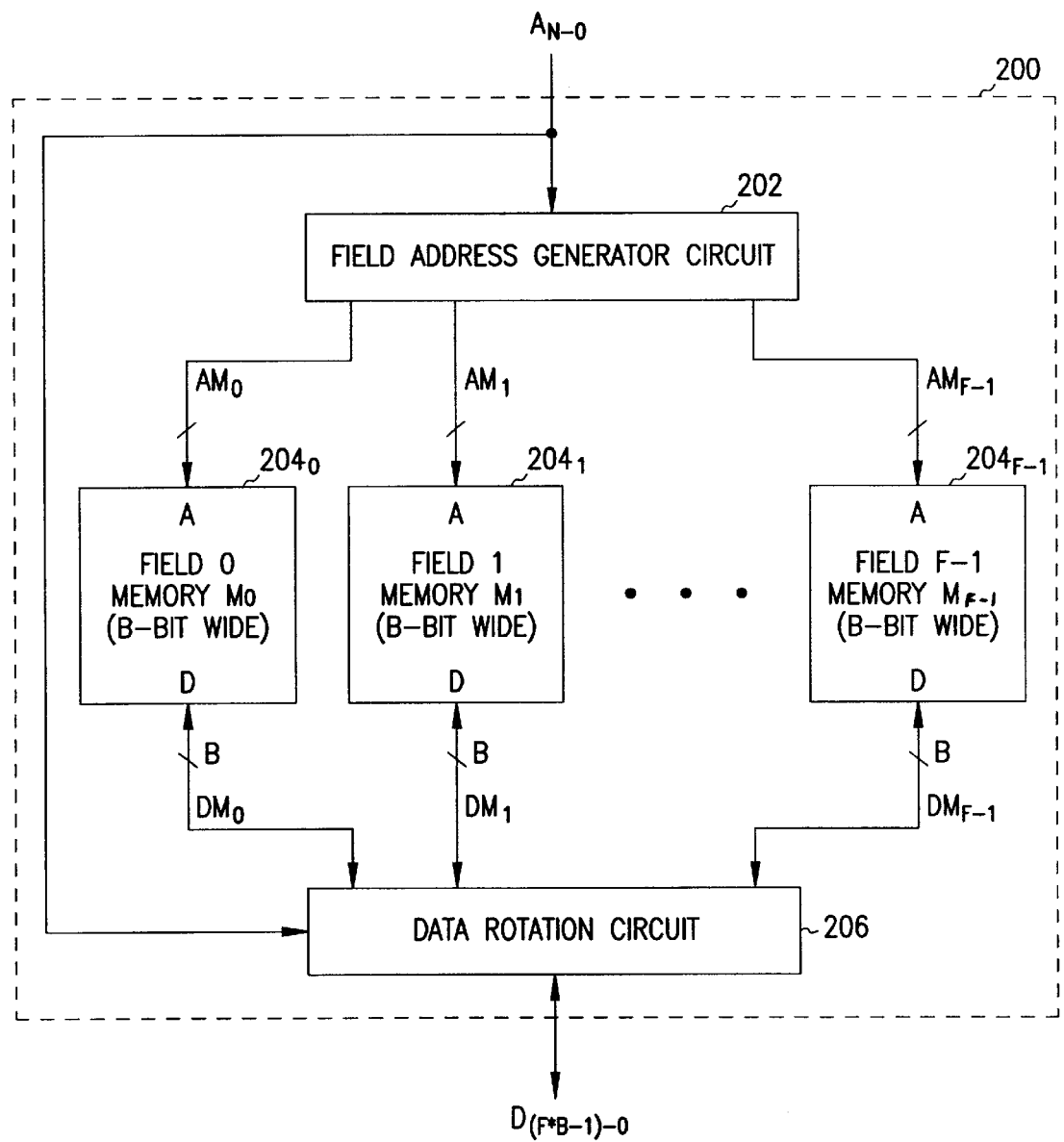
FIG. 2 is a generalized block diagram of a memory that supports aligned and non-aligned memory accesses, in accordance with one embodiment of the present invention.

Referring to FIG. 2, a block diagram of a memory 200 that supports aligned and non-aligned memory accesses in a single clock cycle is shown. Memory 200 is organized as a number of words, with each word having F fields, and each field having B bits. Each word of memory 200 is, thus, F*B bits wide. In one specific embodiment, memory 200 is organized as a number of 32-bit words, with each word having 4 fields, and each field having 8 bits (i.e., a byte). In other embodiments, memory 200 is organized as a number of words having 16, 64, 128, etc. bits, with each word divided into multiple fields, and each field having multiple bits. Memory 200 includes a field address generator circuit 202, a plurality F of field memories $204_0, 204_1, \ldots, 204_{F-1}$, and a data rotation circuit 206. Field memories $204_0, 204_1, \ldots, 204_{F-1}$ may also be referred to herein as $M_0, M_1, \ldots, M_{F-1}$.

Field address generator circuit 202 receives a plurality (i.e., N+1) of address signals $A_{N-0}$ that together provide an address associated with an access of memory 200. The number N will depend on the depth of memory 200. The memory access can be for a read or a write access, and can be for an aligned or a non-aligned access. In response to an address associated with a memory access, field address generator circuit 202 generates a plurality (i.e., F) of field addresses $AM_0, AM_1, \ldots, AM_{F-1}$. Each field address $AM_n$ is then applied as an address input to a corresponding one of field memories $204_n$. The manner in which field addresses $AM_0, AM_1, \ldots, AM_{F-1}$ are generated by field address generator circuit 202 in response to the received address signals $A_{N-0}$ is described in detail below.

Each of field memories $204_0, 204_1, \ldots, 204_{F-1}$ receives the corresponding one of field addresses $AM_0, AM_1, \ldots, AM_{F-1}$ from field address generator circuit 202, and uses that received field address to access an internal memory location used for storing data. Each field memory $204_n$ corresponds to one of the F fields of the words of memory 200. Thus, since each word has F fields, and each field has B bits, there are F field memories $204_n$ (n=0 to F−1), and each field memory $204_n$ is B bits wide to store one field of data. Each field memory $204_n$ is configured to store data associated with a memory access at an address specified by field address $AM_n$. In particular, in response to a read access, each field memory $204_n$ outputs the B bits of data stored at the address specified by $AM_n$ on its input/output (I/O) data lines $DM_n$. In response to a write access, each field memory $204_n$ stores the B bits of data present on its I/O data lines $DM_n$ at the address specified by $AM_n$.

Data rotation circuit 206 is coupled to field memories $204_0, 204_1, \ldots, 204_{F-1}$ via I/O data lines $DM_0, DM_1, \ldots, DM_{F-1}$ so that data can be communicated between data rotation circuit 206 and each of field memories $204_0, 204_1, \ldots, 204_{F-1}$. Data rotation circuit 206 is also configured to receive at least a portion of the memory access address from at least a portion of address signals $A_{N-0}$ for use in controlling rotation of data words in a manner that supports both aligned and non-aligned accesses, as described in detail below. During a read access, data rotation circuit 206 receives data read from each of field memories $204_0, 204_1, \ldots, 204_{F-1}$, combines that data into a word having F fields of B bits each, and rotates that word based on the memory address to support an aligned or non-aligned read access. The resulting data is then output via F*B data signals, which are referred to as $D_{(F*B-1)-0}$ in FIG. 2. During a write access, data rotation circuit 206 receives a word of data written to memory 200 via data signals $D_{(F*B-1)-0}$, rotates that word based on the memory address to support an aligned or non-aligned write access, and applies the resulting data to field memories $204_0, 204_1, \ldots, 204_{F-1}$ to be stored therein. Thus, regardless of whether the memory access involves a read access or a write access, memory 200 supports both aligned and non-aligned accesses. The manner in which this occurs is described below.

In one embodiment, memory 200 is a random access memory (RAM) configured to support both aligned and non-aligned read accesses, and aligned and non-aligned write accesses. The RAM can be, for example, a Static RAM (SRAM), a Dynamic RAM (DRAM), a Synchronous SRAM (SSRAM), a Synchronous DRAM (SDRAM), or other type of RAM. In another embodiment, memory 200 is modified to support aligned and non-aligned read accesses, and aligned write accesses, but is not configured to support non-aligned write accesses. In yet another embodiment, memory 200 is modified to support aligned read accesses, and aligned and non-aligned write accesses, but is not configured to support non-aligned read accesses. In still another embodiment, the apparatus and method for performing non-aligned memory accesses that is described herein is used with a read only memory (ROM) to support aligned and non-aligned memory accesses. The ROM can be, for example, a programmable ROM (PROM), an erasable PROM (EPROM), an electrically-erasable PROM (EEPROM), or another type of ROM. Other modifications will be apparent to a person of skill in the art upon reviewing the present specification.

Figure 3:
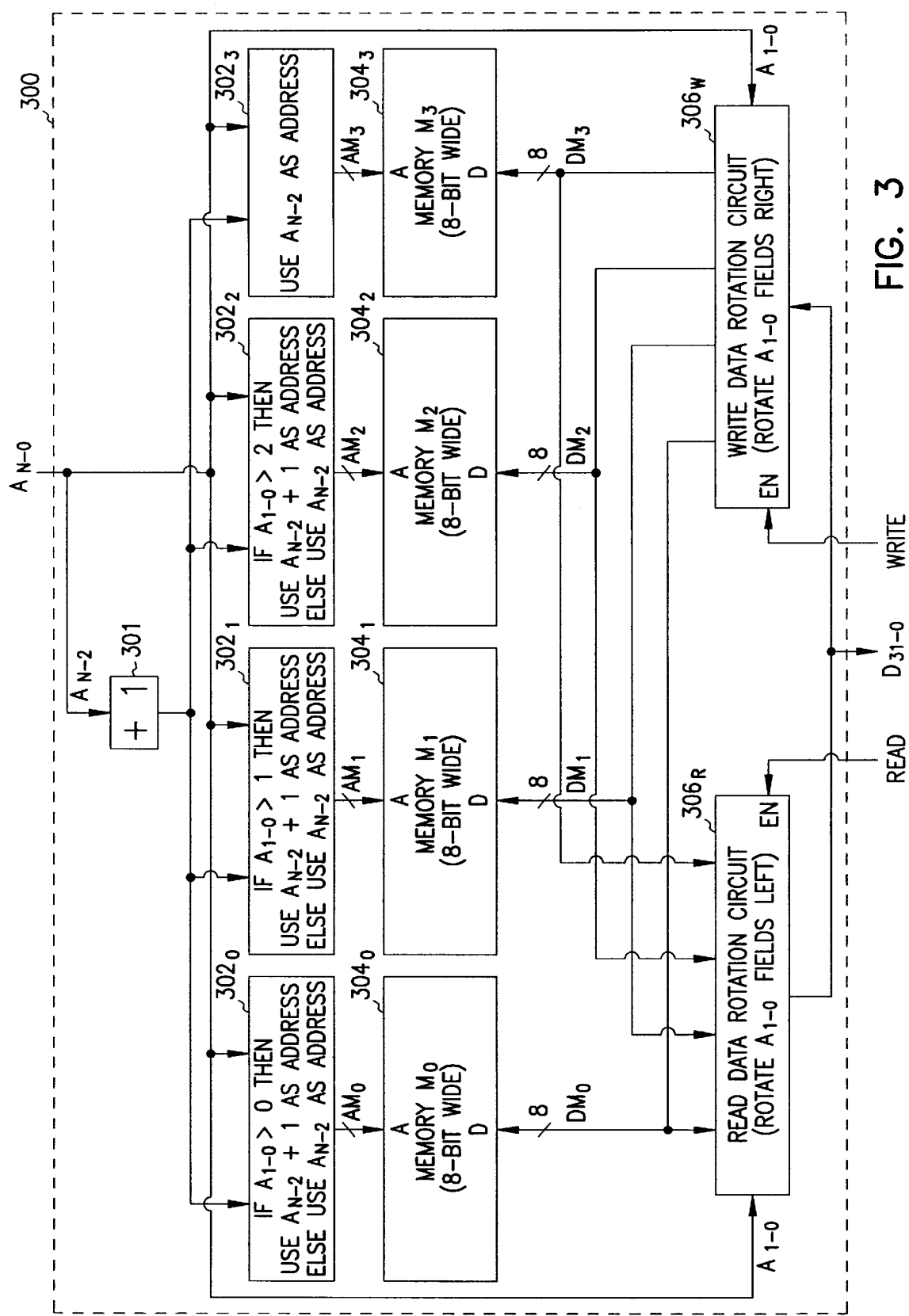
FIG. 3 is a schematic block diagram of a memory that supports aligned and non-aligned memory accesses, in accordance with another embodiment of the invention.

Referring to FIG. 3, a block diagram of a memory 300 that supports aligned and non-aligned memory accesses in a single clock cycle is illustrated, in accordance with another embodiment of the invention. Memory 300 is organized as a number of 32-bit words, with each word having 4 fields, and each field having 8 bits. Thus, memory 300 is a more specific embodiment than that of FIG. 2, with F=4 and B=8. Memory 300 includes a field address generator circuit including an adder 301 and four field address generators $302_0$, $302_1$, $302_2$, $302_3$, four field memories $304_0$, $304_1$, $304_2$, $304_3$, and a data rotation circuit including a read data rotation circuit $306_R$ and a write data rotation circuit $306_W$. Field memories $304_0$, $304_1$, $304_2$, $304_3$ may also be referred to as $M_0$, $M_1$, $M_2$, $M_3$.

Adder 301 receives a more significant portion of address signals $A_{N-0}$, adds one to that portion, and outputs the result to each field address generator $302_0$, $302_1$, $302_2$, $302_3$. In this embodiment, the more significant portion of the address signals includes address signals $A_N$ through $A_2$, designated $A_{N-2}$ in FIG. 3. Thus, for example, if $A_{N-0}=1000_2$, then adder 301 will output $10_2+1=11_2$. Note that adder 301 does not operate on the less significant portion of address signals $A_{N-0}$ which in this embodiment includes signals $A_{N-0}$.

Each field address generator $302_0$, $302_1$, $302_2$, $302_3$ receives signals including the output of adder 301 and the plurality (i.e., N+1) of address signals $A_{N-0}$ that provide the address associated with the access of memory 300. Note that the number N depends on the depth of memory 300, the access can be for a read or a write access, and the access can be for an aligned or a non-aligned access. In response to an address associated with an access, each field address generator $302_n$ generates a field address $AM_n$ as follows:

If $A_{1-0}>n$ then
   Use $A_{N-2}+1$ as address $AM_n$
Else
   Use $A_{N-2}$ as address $AM_n$
Endif Thus, the memory access address $A_{N-0}$ includes a more significant portion $A_{N-2}$ and a less significant portion $A_{1-0}$. Each field address generator $302_n$ tests the less significant portion $A_{1-0}$ by comparing $A_{1-0}$ to n. If $A_{1-0}>n$, then $A_{N-2}+1$ is output as field address $AM_n$. If, on the other hand, $A_{1-0} \leq n$, then $A_{N-2}$ is output as field address $AM_n$. Each field address $AM_n$ is then applied as the address input to a corresponding one of field memories $304_n$.

Note that, in FIG. 3, field address generator $302_3$ is designated as "USE $A_{N-2}$ AS ADDRESS", instead of being designated with the logic used for field address generators $302_0$, $302_1$, and $302_2$. For this case (i.e., n=3), the result of the test $A_{1-0}>n$ will always be false since the largest possible value of $A_{1-0}$ is 3. Thus, "USE $A_{N-2}$ AS ADDRESS" can be used to designate field address generator $302_3$. Alternatively, generator $302_3$ could be designated to use the same logic as the other field address generators $302_n$, with n=3. In either case, the output of field address generator $302_3$ (i.e., $AM_3$) will be set to $A_{N-2}$.

Each of field memories $304_0$, $304_1$, $304_2$, $304_3$ receives the corresponding one of field addresses $AM_0$, $AM_1$, $AM_2$, $AM_3$ from field address generators $302_0$, $302_1$, $302_2$, $302_3$, and uses that field address to access an internal memory location used to store data. Each field memory $304_n$ corresponds to one of the 4 fields of the words of memory 300. Thus, since each word has 4 fields, and each field has 8 bits, there are 4 field memories $304_n$ (i.e., n=0 to 3), and each field memory $304_n$ is 8 bits wide to store one field of data (i.e., one byte). Each field memory $304_n$ stores data associated with a memory access at an address specified by its field address $AM_n$. In particular, in response to a read access, each field memory $304_n$ outputs the 8 bits of data stored at the address specified by $AM_n$ on its I/O data lines $DM_n$. In response to a write access, each field memory $304_n$ stores the 8 bits of data presented on its I/O data lines $DM_n$ at the address specified by $AM_n$.

Data rotation circuits $306_R$ and $306_W$ are each coupled to field memories $304_0$, $304_1$, $304_2$, $304_3$ via I/O data lines $DM_0$, $DM_1$, $DM_2$, $DM_3$ so data can be communicated between circuits $306_R$ and $306_W$ and field memories $304_0$, $304_1$, $304_2$, $304_3$. Data rotation circuits $306_R$ and $306_W$ also receive at least a portion of the memory access address from at least a portion of address signals $A_{N-0}$ for use in controlling rotation of data words in a manner that supports both aligned and non-aligned accesses. In this embodiment, data rotation circuits $306_R$ and $306_W$ receive the less significant portion $A_{1-0}$ of the memory access address $A_{N-0}$. Further, read data rotation circuit $306_R$ receives a read control signal READ, and write data rotation circuit $306_W$ receives a write control signal WRITE.

During a read access, read data rotation circuit $306_R$ receives data read from each of field memories $304_0$, $304_1$, $304_2$, $304_3$, combines that data into a word having 4 fields of 8 bits each, and rotates that word based on the memory address to support an aligned or non-aligned read access. In particular, read data rotation circuit $306_R$ rotates the word left by a number of fields determined by the less significant portion of the access address. Since each field is eight bits (i.e., one byte) for memory 300, the data word is thus rotated $A_{1-0}$ bytes left. For example, for a non-aligned read access where $A_{1-0}=1$, the data word is rotated 1 byte left. On the other hand, since $A_{1-0}=0$ for an aligned read access, read data rotation circuit $306_R$ will not rotate the data associated with an aligned read access. The data which results from the rotation left (if any) is then output via data signals $D_{31-0}$.

During a write access, write data rotation circuit $306_W$ receives a word of data written to memory 300 via data signals $D_{31-0}$, rotates that data word based on the memory address to support an aligned or non-aligned write access, and applies the resulting data to field memories $304_0$, $304_1$, $304_2$, $304_3$ to be stored therein. In particular, write data rotation circuit $306_W$ rotates the word right by a number of fields that is determined by the less significant portion of the access address. Since each field is eight bits (i.e., one byte), the data word is thus rotated $A_{1-0}$ bytes right. For example, for a non-aligned write access where $A_{1-0}=1$, the data word is rotated 1 byte right. On the other hand, since $A_{1-0}=0$ for an aligned write access, write data rotation circuit $306_W$ will not rotate the data associated with an aligned write access. The data resulting from the rotation (if there is any rotation) is then stored in the memory. Thus, regardless of whether the memory access involves a read access or write access, memory 300 supports both aligned and non-aligned accesses.

As shown in FIG. 3, read data rotation circuit $306_R$ and write data rotation circuit $306_W$ receive the control signals READ and WRITE, respectively. The READ signal is applied to an enable input EN of read data rotation circuit $306_R$, and is used to enable the output signals from read data rotation circuit $306_R$ during a read access. The WRITE signal is applied to an enable input EN of write data rotation circuit $306_W$ and is used to enable the output signals from write data rotation circuit $306_W$ during a write access. In another embodiment, a single control signal enables data rotation circuits $306_R$ and $306_W$. For example, memory 300 could receive a write enable (/WE) signal having a first state (e.g., 1) indicative of reads, and a second state (e.g., 0) indicative of writes. The /WE signal could then be used to enable rotation circuits $306_R$ and $306_W$. For example, /EN inputs of circuits $306_R$ and $306_W$ could be active low, and /WE could be coupled directly to /EN of circuit $306_W$ and could be coupled through an inverter to /EN of circuit $306_R$. Other control signals can also be used, as would be apparent to a person of skill in the art.

In one embodiment, memory 300 is a random access memory (RAM) configured to support both aligned and non-aligned read accesses, and aligned and non-aligned write accesses. The RAM could be, for example, a static RAM, a dynamic RAM (DRAM), a synchronous RAM (SRAM), or another type of RAM. In another embodiment, memory 300 is modified to support both aligned and non-aligned read accesses, and aligned write accesses, but is not configured to support non-aligned write accesses (e.g., by eliminating write data rotation circuit $306_W$). In another embodiment, memory 300 is modified to support aligned read accesses, and aligned and non-aligned write accesses, but is not configured to support non-aligned read accesses (e.g., by eliminating read data rotation circuit $306_R$). In yet another embodiment, a read only memory (ROM) is configured as described herein to support both aligned and non-aligned accesses. The ROM can be, for example, a programmable ROM (PROM), an erasable PROM (EPROM), an electrically-erasable PROM (EEPROM), or another type of ROM. Other modifications will also be apparent to a person of ordinary skill in the art upon reviewing the present specification.

Memory 300 is organized as a number of 32-bit words, each word having 4 fields of 8 bits each. In other embodiments, a memory that supports aligned and non-aligned accesses is organized as a number of F*B-bit words, with each word having F fields of B bits each. Such a memory includes F field address generators $302_n$, and F corresponding B-bit field memories $304_n$. The less significant portion of the memory access address $A_{N-0}$ includes address bits sufficient to select the field memories $304_n$. (e.g., X bits, where $2^X$F), and the more significant portion of the address includes the remaining address bits. For example, if a memory is organized as a number of 32-bit words, each word having 4 fields of 8 bits each, then there are 4 field address generators and 4 corresponding field memories, and the less significant portion of the memory access address includes 2 bits. For another example, if a memory is organized as 64-bit words, each word having 8 fields of 8 bits each, then there are 8 field address generators and 8 corresponding field memories, and the less significant portion of the memory access address includes 3 bits.

Figure 4:
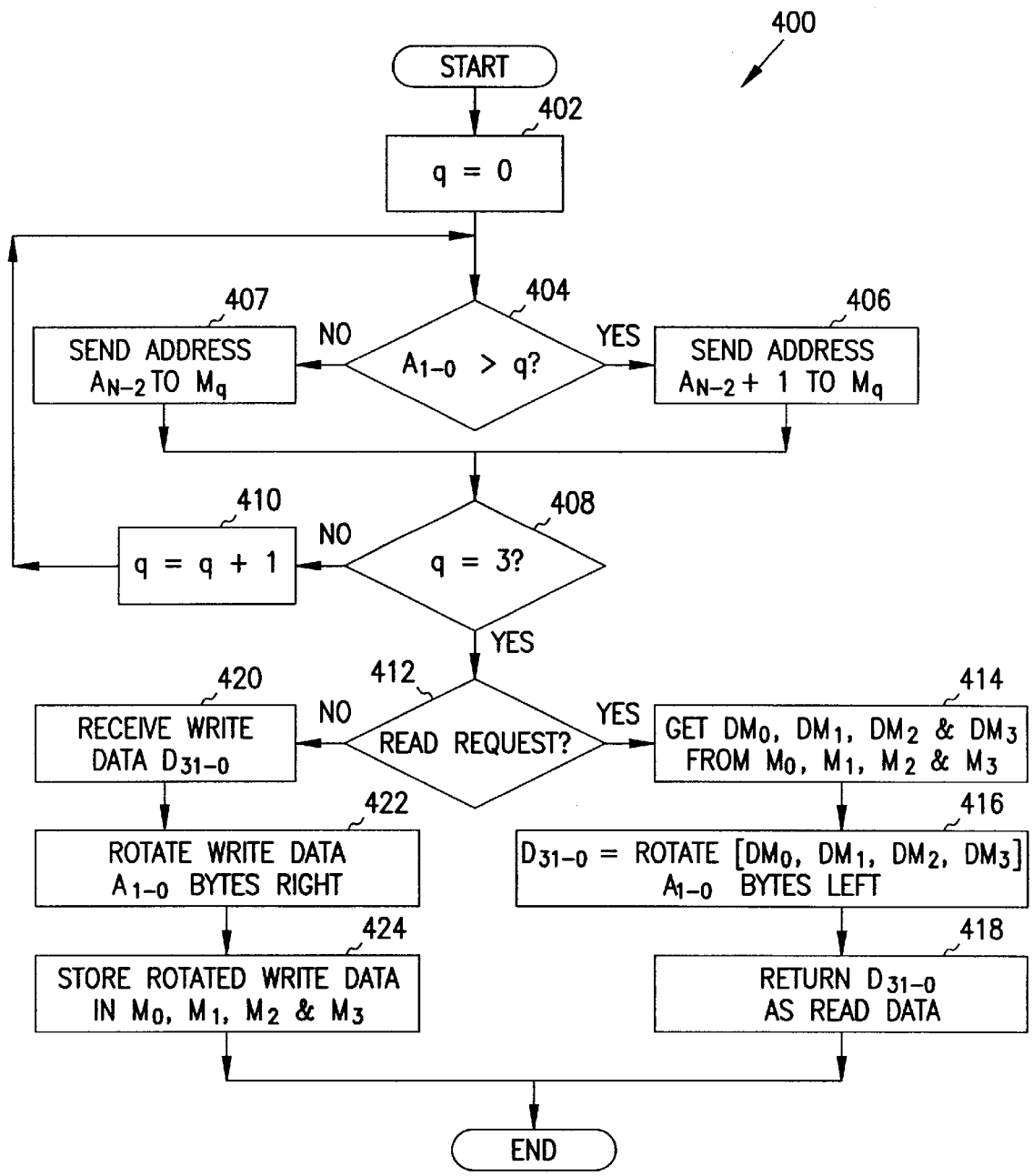
FIG. 4 is a flow chart of a method for performing memory accesses including non-aligned memory accesses, in accordance with another embodiment of the invention.

Thus, when a read request is received by memory 300, the following process is used to determine what field address $AM_n$ to use for each of the n field memories $M_n$:

For q=0 to 3
   If $A_{1-0}$>q then
      Send address $A_{N-2}$+1 to $M_q$
   Else
      Send address $A_{N-2}$ to $M_q$
   Endif
Endloop Alternatively, since $A_{1-0}$ will never be greater than 3, the loop specified above could be repeated for only q=0 to 2, and the loop could be followed by "Send address $A_{N-2}$ to $M_3$". The data $DM_n$ read from each of field memories $M_n$ is then processed as follows:

$D_{31-0}$=Rotate [$DM_0$, $DM_1$, $DM_2$, $DM_3$] $A_{1-0}$ bytes left
Return $D_{31-0}$ as the read data On the other hand, when a write request is received, the same process is used to determine what field address $AM_n$ to use for each of the n field memories $M_n$. However, in this case, the write data that is being written to memory 300 is processed as follows:

Rotate [write data $D_{31-1}$] $A_{1-0}$ bytes right
Store rotated write data in field memories $M_0$, $M_1$, $M_2$, $M_3$ Referring to FIG. 4, a method 400 for performing aligned or non-aligned read and write accesses using memory 300 as described above is illustrated in flow chart form. At reference numeral 402, an index q is initialized to 0. Then, at 404, less significant portion $A_{1-0}$ of the memory access address is tested by comparing $A_{1-0}$ to index q. If $A_{1-0}$>q, then address $A_{N-2}$+1 is sent to field memory $M_q$ at 406. On the other hand, if $A_{1-0} \leq q$, address $A_{N-2}$ is sent to field memory $M_q$ at 407. At 408, the index q is compared to the number of fields less one (e.g., 3) in each memory word. If q<3, index q is incremented at 410, and steps 404 to 408 are repeated to generate the field address for the next field memory $M_q$. Once q has reached 3, method 400 has generated all of the field addresses. Alternatively, since $A_{1-0}$ will not exceed 3, the test at 408 could be replaced with "q=2?", and "Send address $A_{N-2}$ to $M_3$" could be inserted into method 400 (e.g., between 408 and 412).

At 412, method 400 determines if a read or write access was requested. If a read was requested, data $DM_0$, $DM_1$, $DM_2$, $DM_3$ is received from field memories $M_0$, $M_1$, $M_2$, $M_3$ at 414, is combined and rotated $A_{1-0}$ bytes left at 416, and is then returned as read data $D_{31-0}$ at 418. If, on the other hand, a write was requested, write data $D_{31-0}$ is received by memory 300 at 420, is rotated $A_{1-0}$ bytes right at 422, and is then stored as data $DM_0$, $DM_1$, $DM_2$, $DM_3$ in field memories $M_0$, $M_1$, $M_2$, $M_3$ at 424. Thus, as indicated by FIG. 4, determination of the field addresses is the same for both read and write accesses, while the processing of the data depends on whether the memory access is a read or a write.

EXAMPLES

Figure 5:
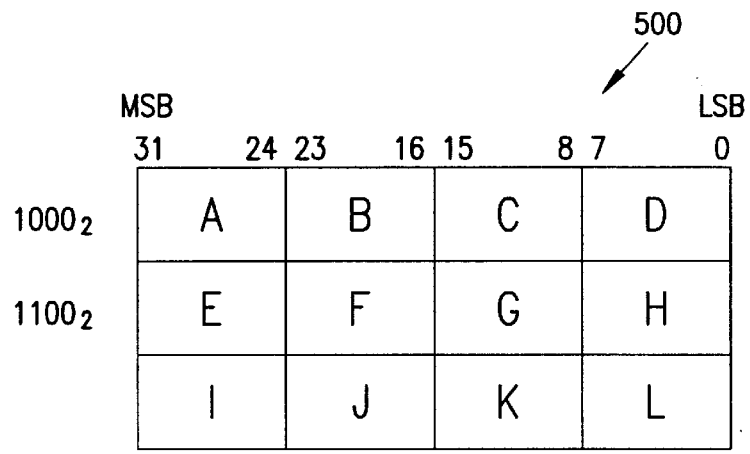
FIG. 5 is a graphical representation of data stored in the memory of FIG. 3, wherein each of the words includes four fields, and each of the fields includes eight bits.

The performance of aligned and non-aligned read accesses by memory 300 (FIG. 3) is now described by a set of examples. For these examples, assume that memory 300 stores the data 500 of FIG. 5. In particular, the left-most bytes (i.e., bits 31–24, storing data A, E, I) are stored in field memory $M_0$, the next bytes (i.e., bits 23–16, storing data B, F, J) are stored in field memory $M_1$, the next bytes (i.e., bits 15–8, storing data C, G, K) are stored in field memory $M_2$, and the right-most bytes (i.e., bits 7–0, storing data D, H, L) are stored in field memory $M_3$. Also, assume that the base address in FIG. 5 is $1000_2$.

In a first read access, memory 300 receives a 32-bit read request using memory access address $1000_2$. Since the remainder of this address (i.e., $A_{N-0}$=$1000_2$) divided by the number of fields (i.e., F=4) equals 0, this request is for an aligned read. In this case, since $A_{1-0}$=0, field address generators $302_0$, $302_1$, $302_2$, $302_3$ all generate the same field address of $A_{N-2}$=$10_2$ (i.e., $AM_0$=$AM_1$=$AM_2$=$AM_3$=$10_2$). In response, field memories $304_0$, $304_1$, $304_2$, $304_3$ generate data A, B, C, D, respectively (i.e., $DM_0$=A, $DM_1$=B, $DM_2$=C, $DM_3$=D). Read data rotation circuit $306_R$ rotates the data received from the field memories (i.e., [A, B, C, D]) $A_{1-0}$=0 bytes left to generate read data $D_{31-0}$=ABCD. Thus, memory 300 properly performs an aligned 32-bit read starting at address $1000_2$.

In a second read access, memory 300 receives a 32-bit read request using memory access address $1001_2$. Since the remainder of this address (i.e., $A_{N-0}=1001_2$) divided by the number of fields (i.e., 4) equals 1, this request is for a non-aligned read. In this case, since $A_{1-0}=01_2$, field address generator $302_0$ generates field address $A_{N-2}+1=11_2$ (i.e., $AM_0=11_2$) and field address generators $302_1$, $302_2$, $302_3$ all generate field address $A_{N-2}=10_2$ (i.e., $AM_2=AM_3=10_2$). In response, field memories $304_0$, $304_1$, $304_2$, $304_3$ generate data E, B, C, D, respectively (i.e., $DM_0=E$, $DM_1=B$, $DM_2=C$, $DM_3=D$). Read data rotation circuit $306_R$ then rotates the data received from the field memories (i.e., [E, B, C, D]) $A_{1-0}=10_2$ bytes left to generate read data $D_{31\_0}=BCDE$. Thus, memory 300 properly performs a non-aligned 32-bit read starting at address $1001_2$.

In a third read access, memory 300 receives a 32-bit read request using memory access address $1010_2$. Since the remainder of this address (i.e., $A_{N-0}=1010_2$) divided by the number of fields (i.e., 4) equals 2, this request is for a non-aligned read. In this case, since $A_{1-0}=10_2$, field address generators $302_0$, $302_1$ both generate field address $A_{N-2}+1=11_2$ (i.e., $AM_0=AM_1 11_2$) and field address generators $302_2$, $302_3$ both generate field address $A_{N-2}=10_2$ (i.e., $AM_2=AM_3=10_2$). In response, field memories $304_0$, $304_1$, $304_2$, $304_3$ generate data E, F, C, D, respectively (i.e., $DM_0=E$, $DM_1=F$, $DM_2=C$, $DM_3=D$). Read data rotation circuit $306_R$ then rotates the data received from the field memories (i.e., [E, F, C, D]) $A_{1-0}=10_2$ bytes left to generate read data $D_{31-0}=CDEF$. Thus, memory 300 properly performs a non-aligned 32-bit read starting at address $1010_2$.

In a fourth read access, memory 300 receives a 32-bit read request using memory access address $1011_2$. Since the remainder of this address (i.e., $A_{N-0}=1011_2$) divided by the number of fields (i.e., 4) equals 3, this request is for a non-aligned read. In this case, since $A_{1-0}=11_2$, field address generators $302_0$, $302_1$, $302_2$ all generate field address $A_{N-2}+1=11_2$ (i.e., $AM_0=AM_1=AM_2=11_2$) and field address generator $302_3$ generates field address $A_{N-2}=10_2$ (i.e., $AM_3=10_2$). In response, field memories $304_0$, $304_1$, $304_2$, $304_3$ generate data E, F, G, D, respectively (i.e., $DM_0=E$, $DM_1=F$, $DM_2=G$, $DM_3=D$). Read data rotation circuit $306_R$ then rotates the data received from the field memories (i.e., [E, F, G, D]) $A_{1-0}11_2$ bytes left to generate read data $D_{31-0}=DEFG$. Thus, memory 300 properly performs a non-aligned 32-bit read starting at address $1011_2$.

The performance of aligned and non-aligned write accesses by memory 300 (FIG. 3) is now described by another set of examples. In a first write access, memory 300 receives a request to write 32-bit data $D_{31-0}=ABCD$ to memory access address $1000_2$. Since the remainder of this address (i.e., $A_{N-0}=1000_2$) divided by the number of fields (i.e., F=4) equals 0, this request is for an aligned write. In this case, since $A_{1-0}=0$, field address generators $302_0$, $302_1$, $302_2$, $302_3$ all generate the same field address of $A_{N-2}=10_2$ (i.e., $AM_0=AM_1=AM_2=AM_3=10_2$). Write data rotation circuit $306_W$ rotates the write data (i.e., [A, B, C, D]) $A_{1-0}=0$ bytes right to generate the data $DM_0=A$, $DM_1=B$, $DM_2C$, $DM_3=D$. The write data is then stored in field memories $M_0$, $M_1$, $M_2$, $M_3$. Thus, memory 300 properly performs an aligned 32-bit write starting at address $1000_2$.

In a second write access, memory 300 receives a request to write data $D_{31-0}=BCDE$ to memory access address $1001_2$. Since the remainder of this address (i.e., $A_{N-0}1001_2$) divided by the number of fields (i.e., 4) equals 1, this request is for a non-aligned write. In this case, since $A_{1-0}01_2$, field address generator $302_0$ generates field address $A_{N-2}+1=11_2$ (i.e., $AM_0=11_2$) and field address generators $302_1$, $302_2$, $302_3$ all generate field address $A_{N-2}=10_2$ (i.e., $AM_1=AM_2=AM_3=10_2$). Write data rotation circuit $306_W$ rotates the data [B, C, D, E] $A_{1-0}=01_2$ bytes right to generate the data $DM_0=E$, $DM_1=B$, $DM_2=C$, $DM_3=D$. The write data is then stored in field memories $M_0$, $M_1$, $M_2$, $M_3$. Thus, memory 300 properly performs a non-aligned write starting at address $1001_2$.

In a third write access, memory 300 receives a request to write data $D_{31-0}=CDEF$ to memory access address $1010_2$. Since the remainder of this address (i.e., $A_{N-0}=1010_2$) divided by the number of fields (i.e., 4) equals 2, this request is for a non-aligned write. In this case, since $A_{1-0}=10_2$, field address generators $302_0$, $302_1$ both generate field address $A_{N-2}+1=11_2$ (i.e., $AM_0=AM_1=11_2$) and field address generators $302_2$, $302_3$ both generate field address $A_{N-2}=10_2$ (i.e., $AM_2=AM_3=10_2$). Write data rotation circuit $306_W$ rotates the data [C, D, E, F] $A_{1-0}=10_2$ bytes right to generate data $DM_0=E$, $DM_1=F$, $DM_2=C$, $DM_3=D$. The write data is then stored in field memories $M_0$, $M_1$, $M_2$, $M_3$. Thus, memory 300 properly performs a non-aligned write starting at address $1010_2$.

In a fourth write access, memory 300 receives a request to write data $D_{31-0}=DEFG$ to memory access address $1011_2$. Since the remainder of this address (i.e., $A_{N-0}1011_2$) divided by the number of fields (i.e., 4) equals 3, this request is for a non-aligned write. In this case, since $A_{1-0}=11_2$, field address generators $302_0$, $302_1$, $302_2$ all generate field address $A_{N-2}+1=11_2$ (i.e., $AM_0=AM_1=AM_2=11_2$) and field address generator $302_3$ generates field address $A_{N-2}=10_2$ (i.e., $AM_3=10_2$). Write data rotation circuit $306_W$ rotates the data [D, E, F, G] $A_{1-0}=11_2$ bytes right to generate the data $DM_0=E$, $DM_1=F$, $DM_2=G$, $DM_3=D$. The write data is then stored in field memories $M_0$, $M_1$, $M_2$, $M_3$. Thus, memory 300 properly performs a non-aligned write starting at address $1011_2$.

Note that the addresses and data used for the examples of aligned and non-aligned reads, and aligned and non-aligned writes, that are described above are provided only as examples, and that many other values of addresses and data can be used by memory 300.

While embodiments of the above-described memories, methods and systems support read and write memory accesses, other embodiments support only read memory accesses, or only write memory accesses. For example, memory 300 in FIG. 3 could be modified to delete write data rotation circuit $306_W$, or to delete read data rotation circuit $306_R$ as would be apparent to a person of skill in the art after reviewing this application.

In one embodiment, the read or write port is as wide as the combined width of all of the field memories. For example, a port may be 32-bits wide, equal to the combined width of four 8-bit field memories. In another embodiment, the port is not as wide as the combined width of all of the field memories. For example, a memory according to this embodiment can have 3 ports: a 32-bit read port supporting non-aligned accesses; a 64-bit read port not supporting non-aligned accesses; and a 64-bit write port not supporting non-aligned accesses. These examples are not limiting, and other memory configurations wherein the read or write port is or is not as wide as the combined width of all of the field memories will be apparent to a person of skill in the art after reviewing this application.

In one embodiment, words in a memory which supports non-aligned accesses in accordance with the present invention use big endian format, in which bytes in a word are organized such that the most significant byte or digits are placed leftmost in the structure. In another embodiment, a little endian format is used, in which the least significant byte or digits are placed on the left. In yet another embodiment, a bi-endian format is used to handle both types of byte or digit ordering (i.e., both big endian and little endian formats).

In the embodiment shown in FIG. 3, the data rotators are located close to (e.g., adjacent to) the field memories, such that the data is rotated directly after being read from the field memories, or is rotated directly before being written to the field memories. In other embodiments, the data rotators are located farther away from the field memories, with one or more circuit elements between the field memories and the data rotators. For example, in one embodiment where the request is issued by a central processing unit, the rotation is performed by the central processing unit through appropriate programming.

Applications

Figure 6:
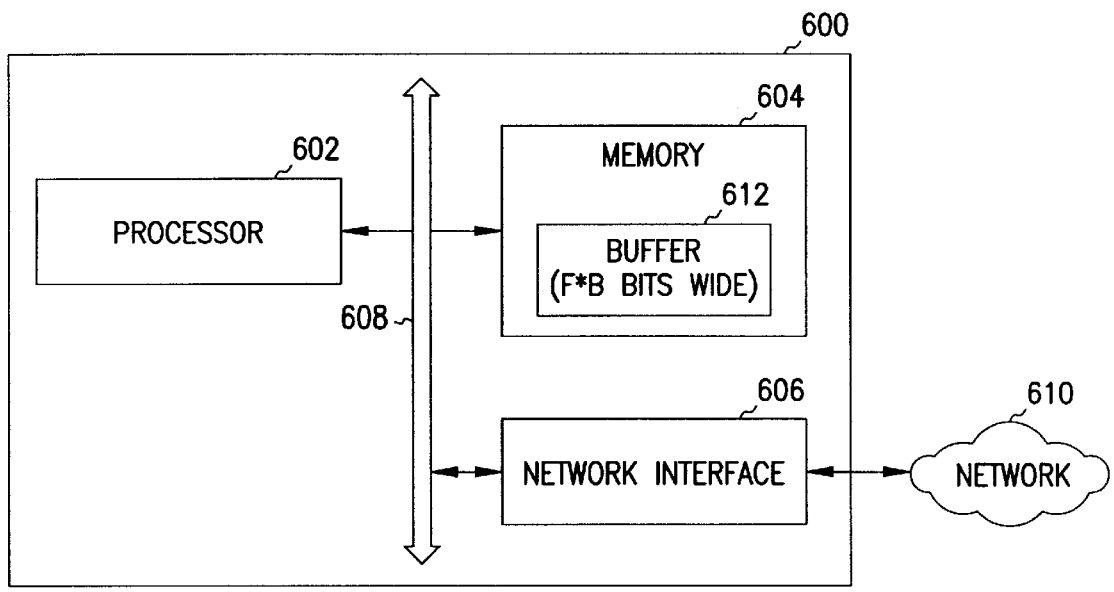
FIG. 6 is a block diagram of a data processing system which includes a memory as shown in FIG. 2 or FIG. 3, in accordance with another embodiment of the invention.

In one embodiment of the invention, a data processing system 600 such as that shown in FIG. 6 includes a processor 602, a memory 604, and a network interface 606. Processor 602, memory 604 and network interface 606 are coupled via a communication bus 608 (e.g., an address/data/control signal bus) that allows communications to occur. Memory 604 supports aligned and non-aligned read and write accesses over bus 608, and is configured as described above in relation to memory 200 or 300. In one embodiment, memory 604 is a discrete device that is not physically part of processor 602. In another embodiment, memory 604 and processor 602 are integrated into a single device. For example, memory 604 may form an on-chip processor memory. In another embodiment, data processing system 600 includes a plurality of memories 604 coupled to bus 608.

Network interface 606 is also coupled to a network 610, such as a local area network (LAN) or a wide area network (WAN) such as the Internet. Network interface 606 performs bi-directional communications between system 600 and network 610. In one embodiment, network interface 606 sends and receives packets of data via network 610. To avoid loading processor 602, packets are stored in a buffer 612 of memory 604. For example, packets received by network interface 606 from network 610 are stored in buffer 612 until they are processed by processor 602. In one embodiment, buffer 612 is organized as a number of words, with each word having F fields of B bits each. For example, buffer 612 can include 32-bit words, each word having 4 fields of 8 bits each.

Figure 7:
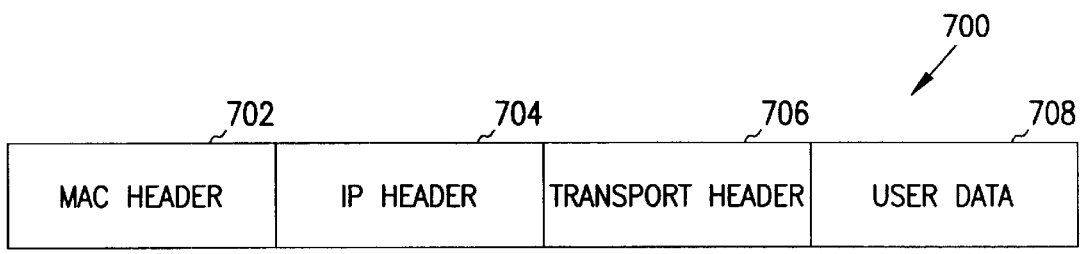
FIG. 7 illustrates the format of an exemplary data packet, including a network protocol header, that is received from a network via the network interface of FIG. 6.

Referring to FIG. 7, an exemplary data packet 700, including a network protocol header, that was received from network 610 via network interface 606 is illustrated. In general, data packet 700 includes a physical layer header such as a Media Access Control (MAC) header 702, a network layer header such an Internet Protocol (IP) header 704, a transport layer protocol header such as an Xpress Transfer Protocol (XTP) header 706, and a user data field 708. The user data could be, for example, fill-motion video data transmitted from a video server to data processing system 600, which acts as a client. Alternatively, the user data could represent many other types of data, such as audio data. A transport layer protocol which is appropriate for the particular application, and for the user data, will be selected. For example, the Realtime Transport Protocol (RTP) is an IP protocol that supports realtime transmission of voice and video data. The transport layer protocol header could also be the Transmission Control Protocol (TCP). Other transport layer protocols may also be selected, depending on the application and the user data.

The physical layer processing of data packets received by data processing system 600, such as data packet 700, takes place in network interface 606. Then, the packets are transferred for storage in a virtual queue or buffer defined in memory 604, such as buffer 612. Processor 602 then further processes the queued data packets stored in buffer 612.

Figure 8:
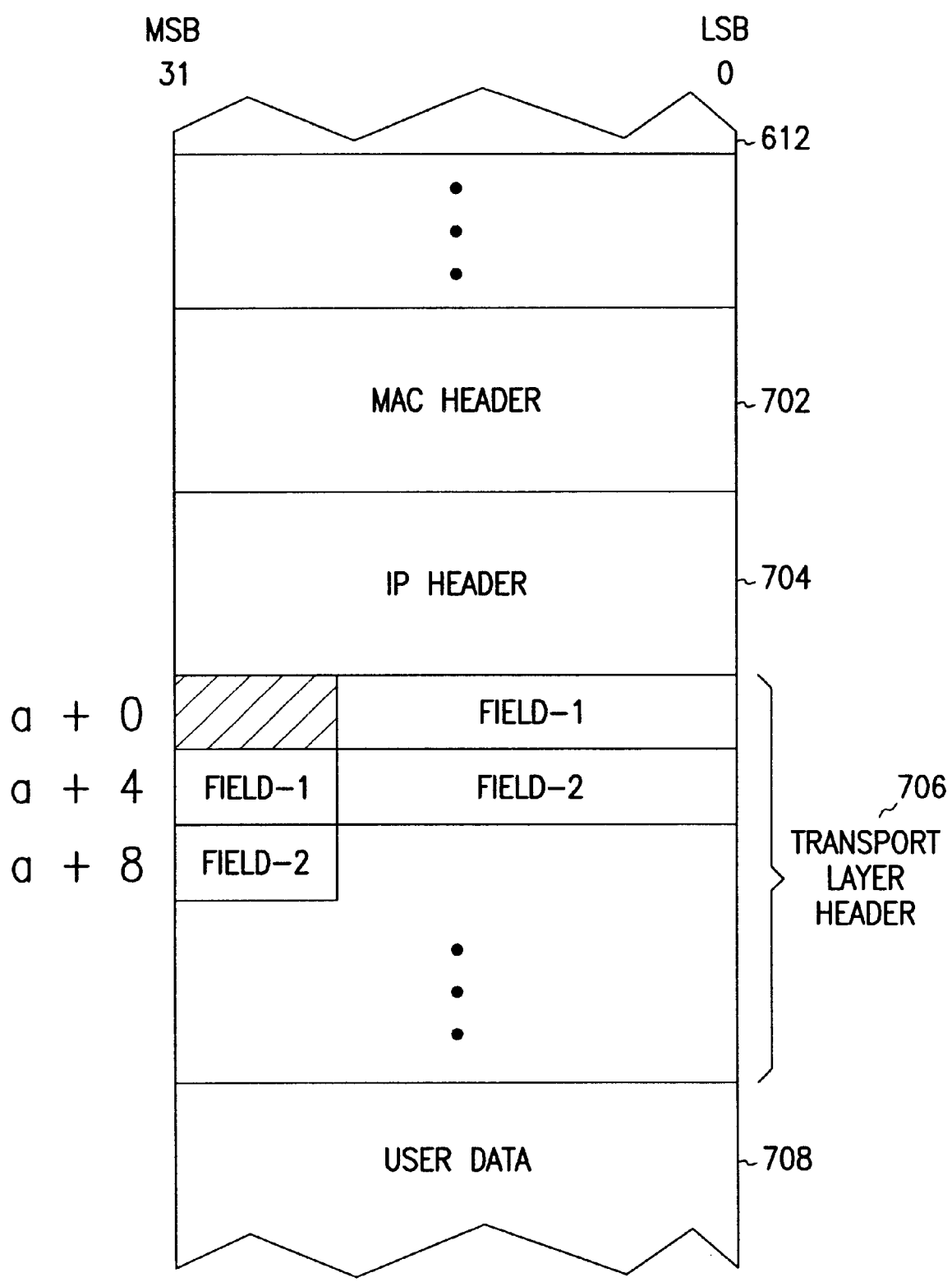
FIG. 8 illustrates exemplary storage of the data packet of FIG. 7 in a buffer of the memory of FIG. 6, wherein several fields of the transport layer header are non-aligned.

Unfortunately, the alignment of packets in buffer 612 is often a matter of chance. In particular, while some packets may be aligned in buffer 612, other packets may not be. For example, assume that transport layer header 706 of a received data packet includes a number of 32-bit fields including FIELD-1 (and possibly a number of other 32-bit fields). In some cases, FIELD-1 may be stored in alignment with 32-bit wide buffer 612 such that FIELD-1 can be accessed using a single, aligned 32-bit access. In other cases, however, FIELD-1 may be stored in a non-aligned manner. For example, as illustrated in FIG. 8, FIELD-1 of transport layer header 706 may be stored at starting address "a+1". In other examples, FIELD-1 could be stored at starting address "a+2" or "a+3". In such cases of non-aligned storage, conventional systems have not been able to directly access each non-aligned field in a single memory access, and have resorted to additional processing. For example, one solution to the problem of accessing FIELD-1 involves performing a first 32-bit aligned access at starting address "a+0" to obtain the first 24 bits of FIELD-1, performing a second 32-bit aligned access at starting address "a+4" to obtain the last 8 bits of FIELD-1, and then merging these bits into a single 32-bit word. This solution, however, requires relatively complex processing, and requires more than one clock cycle.

Instead, as noted above, memory 604 is configured as described above in relation to memory 200 or 300. Memory 604 supports read and write accesses in one clock cycle regardless of whether the data is aligned or non-aligned. Thus, data such as FIELD-1 of transport layer header 706 is read from, or written to, memory 604 in a single clock cycle regardless of its address. For example, network interface 606 can write a received packet such as packet 700 into buffer 612 in a single clock cycle at a starting address of "a+0", "a+1", "a+2" or "a+3", and processor 602 can read the received packet from buffer 612 in a single clock cycle at any of these addresses. For another example, processor 602 can write a packet such as packet 700 into buffer 612 in a single clock cycle at a starting address of "a+0", "a+1", "a+2" or "a+3", and network interface 606 can read the packet from buffer 612 in a single clock cycle at any of these addresses. Thus, by using memory 604, data processing system 600 handles network data efficiently and quickly.

Conclusion

Thus, a memory that supports aligned and non-aligned accesses in a single clock cycle has been described herein. In one embodiment, memory 200 includes field address generator circuit 202, field memories $204_0, \ldots, 204_{F-1}$, and data rotation circuit 206. Field address generator circuit 202 generates field addresses $AM_0, \ldots, AM_{F-1}$ in response to a memory access address $A_{N-0}$ associated with a memory access. Each field memory $204_0, \ldots, 204_{F-1}$ receives one of the field addresses from field address generator circuit 202. Data rotation circuit 206 rotates data associated with the memory access based on at least a portion of the memory access address to support aligned and non-aligned accesses. In one embodiment, the memory supports aligned and non-aligned read accesses. In another embodiment, the memory supports aligned and non-aligned write accesses. A method for performing aligned and non-aligned read and/or write accesses has also been described.

In one embodiment, a memory or method as described herein is used by a network component, such as a network processor or a switching chipset, for processing network protocol headers. Network protocol headers are often not placed at a fixed offset in all frames, such that the various fields in the headers may or may not be aligned in memory. By being able to directly access the fields in the headers without taking into account the absolute offset into the frame, the processing of network protocol headers may be made significantly simpler and faster in comparison to that required by conventional systems.

Often, a frame will be aligned in memory, such that the network interface will perform aligned memory accesses. Even in this situation, the memories, methods and systems described herein for performing non-aligned accesses may advantageously be employed by programs to access fields that have a non-aligned offset into the frame. Thus, though the frame itself may be aligned, certain fields within the frame may not be aligned, and may be accessed using the memories, methods and systems described herein.

The above description and the accompanying drawings are intended to be illustrative of the present invention, and not restrictive. Many other embodiments will be apparent to those of ordinary skill in the art upon reviewing the above description. The scope of the invention should therefore be determined with reference to the appended claims, along with the full scope of equivalents to which such claims are entitled.

What is claimed is:

1. A memory that supports a non-aligned memory access, comprising:
   a field address generator configured to generate a plurality of field addresses in response to a memory access address;
   a plurality of field memories to store memory access data, each field memory configured to receive one of the field addresses from the field address generator; and
   a data rotator configured to rotate at least a portion of the memory access data based on at least a portion of the memory access address to support a non-aligned access.

2. The memory of claim 1, wherein the field address generator comprises a plurality of field address generator modules, and each field address generator module is configured to generate the field address for one of the field memories.

3. The memory of claim 2, wherein the memory access address comprises a more significant portion and a less significant portion, and each field address generator module is configured to test the less significant portion to generate its respective field address.

4. The memory of claim 3, wherein each field address generator module is adapted to generate its respective field address based on the more significant portion and a result of the test.

5. The memory of claim 1, wherein the memory is organized as a number of words, each word having F fields, and each field having B bits, and wherein each field memory corresponds to one of the F fields, anti each field memory is B bits wide.

6. The memory of claim 1, wherein the data rotator is configured to rotate data received from each of the field memories during a non-aligned read access.

7. The memory of claim 1, wherein the data rotator is configured to rotate data being written to the memory during a non-aligned write access.

8. The memory of claim 1, wherein the data rotator is configured to rotate the data in a first direction to support a non-aligned read access, and to rotate the data in a second direction to support a non-aligned write access.

9. The memory of claim 1, wherein the memory access address comprises a more significant portion and a less significant portion, and the data rotator is configured to rotate the data by a distance based upon the less significant portion.

10. The memory of claim 1, wherein the data rotator is further configured to not rotate data associated with an aligned memory access.

11. A memory that supports a non-aligned read access, the memory organized as a number of words, each word having F fields, and each field having B bits, comprising:
    a plurality of field address generators, each field address generator configured to generate a field address in response to a memory address associated with a read access;
    a plurality of field memories, wherein each field memory is configured to receive the field address from a corresponding one of the field address generators, and each field memory corresponds to one of the F fields of the memory and is B bits wide, wherein data from at least one of the plurality of field memories is outputted in response to the receipt of the field address; and
    a data rotator configured to combine the data received from each of the field memories into a word having F fields of B bits each, and to rotate the word based upon the memory address to support a non-aligned read access.

12. The memory of claim 11, wherein each field address generator is configured to test a less significant portion of the memory address, and to generate its respective field address based upon a more significant portion of the memory address and the test.

13. The memory of claim 11, wherein the memory address comprises a more significant portion and a less significant portion, and the data rotator is configured to rotate the word by a number of fields determined by the less significant portion.

14. The memory of claim 11, wherein the data rotator is further configured to not rotate data associated with an aligned read access.

15. A memory that supports a non-aligned write access, the memory organized as a number of words, each word having F fields, and each field having B bits, comprising:
    a plurality of field address generators, each field address generator configured to generate a field address in response to a memory address associated with a write access;
    a plurality of field memories, wherein each field memory is configured to receive the field address from a corresponding one of the field address generators, and each field memory corresponds to one of the F fields of the memory and is B bits wide; and
    a data rotator configured to receive a word of data written to the memory during a non-aligned write access, and to rotate the word based upon the memory address to support a non-aligned write access.

16. The memory of claim 15, wherein each field address generator is configured to test a less significant portion of the memory address, and to generate its respective field address based upon a more significant portion of the memory address and a result of the test.

17. The memory of claim 15, wherein the memory address comprises a more significant portion and a less significant portion, and the data rotator is configured to rotate the word by a number of fields determined by the less significant portion.

18. The memory of claim 15, wherein the data rotator is further configured to not rotate a word of data associated with an aligned write access.

19. A method of performing a non-aligned access of a memory, comprising:
   receiving a memory access address associated with a non-aligned memory access;
   generating a plurality of field addresses in response to the memory access address;
   applying each of the field addresses to a corresponding field memory; and
   rotating data associated with the non-aligned memory access based on at least a portion of the memory access address to support the non-aligned memory access.

20. The method of claim 19, wherein the memory is organized as a number of words, each word having F fields, each field having B bits, and wherein generating the plurality of field addresses comprises generating one field address for each field memory.

21. The method of claim 19, wherein generating each of the field addresses comprises testing a less significant portion of the memory access address, and generating that field address based upon a more significant portion of the memory access address and a result of the test.

22. The method of claim 19, wherein the memory access is selected from the group consisting of a read memory access and a write memory access.

23. A data processing system, comprising:
   a processor; and
   a memory that supports a non-aligned access coupled to the processor, comprising:
      a field address generator for generating a plurality of field addresses in response to a memory access address associated with a memory access;
      a plurality of field memories to store field data, each field memory for receiving one of the field addresses from the field address generator; and
      a data rotator for rotating at least a portion of the data associated with the access based on at least a portion of the memory access address to support a non-aligned access.

24. The data processing system of claim 23, further comprising a network interface coupled to the memory, the network interface for communicating packets of data between the data processing system and a network.

25. The data processing system of claim 24, wherein a buffer defined in the memory is used for storing packets of data being communicated over the network.

26. The data processing system of claim 23, wherein each packet of data comprises a network protocol header that comprises at least one field stored as a matter of chance with respect to its alignment in the buffer.

27. A memory, comprising:
   a plurality of memory modules to store a data packet, the data packet comprising user data and a header that comprises a header word, each of the memory modules adapted to store a subdivision of the header word at a designated address;
   an address generator module to receive an address for the header word and to generate an address for each of the subdivisions of the header word; and
   a data modifying module selectively coupled between a memory bus and the memory modules, the data modifying module adapted to shift the header word being communicated between the memory bus and the memory modules by a number of the subdivisions of the header word to compensate for an offset of the header word in the memory modules.

28. The memory of claim 27, wherein the address generator module is adapted to readdress at least one of the memory modules to support a non-aligned memory access.

29. The memory of claim 27, wherein the data modifying module is adapted to shift the header word to support a non-aligned memory access when the offset of the header word differs from an aligned-memory-access offset for the header word.

30. An article of manufacture, comprising:
   a storage device storing instructions for a method of accessing a memory, the memory organized to store words of data having F fields of B bits each, the method including:
      receiving a memory access address associated with a non-aligned memory access;
      generating F field addresses in response to the memory access address;
      applying each of the F field addresses to a corresponding field memory; and
      shifting at least one of the words of data associated with the non-aligned memory access based on at least a portion of the memory access address to support the non-aligned memory access.

31. The article of manufacture of claim 30, wherein the non-aligned memory access is a non-aligned read memory access.

32. The article of manufacture of claim 30, wherein the non-aligned memory access is a non-aligned write memory access.

* * * * *

UNITED STATES PATENT AND TRADEMARK OFFICE
CERTIFICATE OF CORRECTION

PATENT NO. : 6,622,232 B2
DATED : September 16, 2003
INVENTOR(S) : Jacob J. Schroeder It is certified that error appears in the above-identified patent and that said Letters Patent is hereby corrected as shown below:

<u>Title page, Item [54] and Column 1, line 3,</u>
Title, insert -- USING DATA ROTATION -- after "ACCESSES".

<u>Column 13,</u>
Line 63, delete "anti" and insert -- and -- therefor.

Signed and Sealed this

Second Day of March, 2004

JON W. DUDAS
*Acting Director of the United States Patent and Trademark Office*